(12) United States Patent
Girard et al.

(10) Patent No.: US 8,147,189 B2
(45) Date of Patent: Apr. 3, 2012

(54) SECTORIZED NOZZLE FOR A TURBOMACHINE

(75) Inventors: Patrick Joseph Marie Girard, Saint Fargeau Ponthierry (FR); Xavier Firmin Camille Jean Lescure, Boulogne Billancourt (FR); Aurelien Rene-Pierre Massot, Vaux le Penil (FR); Sebastien Jean Laurent Prestel, Arpajon (FR)

(73) Assignee: SNECMA, Paris (FR)

( * ) Notice: Subject to any disclaimer, the term of this patent is extended or adjusted under 35 U.S.C. 154(b) by 646 days.

(21) Appl. No.: 12/330,630

(22) Filed: Dec. 9, 2008

(65) Prior Publication Data

US 2009/0155061 A1   Jun. 18, 2009

(30) Foreign Application Priority Data

Dec. 14, 2007   (FR) ...................... 07 08714

(51) Int. Cl.
*F03B 1/04* (2006.01)

(52) U.S. Cl. ........ 415/191; 415/200; 415/115; 416/210; 416/223

(58) Field of Classification Search .................. 415/191, 415/192, 193, 194, 195, 137, 200, 208.4; 416/210, 223

See application file for complete search history.

(56) References Cited

U.S. PATENT DOCUMENTS

| 4,142,827 A * | 3/1979 | Vinciguerra ................. 415/189 |
| 2011/0044798 A1 * | 2/2011 | Digard Brou De Cuissart et al. ........................... 415/115 |

FOREIGN PATENT DOCUMENTS

| DE | 39 42 785 A1 | 7/1990 |
| DE | 40 17 861 A1 | 12/1991 |
| EP | 1 431 517 A2 | 6/2004 |

* cited by examiner

*Primary Examiner* — David Nhu
(74) *Attorney, Agent, or Firm* — Oblon, Spivak, McClelland, Maier & Neustadt, L.L.P.

(57) ABSTRACT

A sectorized nozzle for a turbomachine, the nozzle being made up of cylindrical sectors and comprising two annular platforms interconnected by substantially radial vanes, together with an annular rail for supporting elements of abradable material, each inner platform having longitudinally-extending edges that are V-shaped, and each rail sector having, on at least one of its sides, means for bearing axially on corresponding means provided on an adjacent nozzle sector.

13 Claims, 3 Drawing Sheets

SECTORIZED NOZZLE FOR A TURBOMACHINE

CROSS-REFERENCE TO RELATED APPLICATIONS

This application claims the benefit of priority under 35 U.S.C. §119 from French application Ser. No. 07/08714 filed Dec. 14, 2007. The entire contents of which are incorporated herein by reference.

FIELD OF THE INVENTION

The present invention relates to a sectorized nozzle, in particular for a low-pressure turbine of an airplane turboprop or turbojet.

BACKGROUND OF THE INVENTION

A turbine of this type comprises stages, each of which comprises a turbine wheel and a stator nozzle, each nozzle being sectorized, i.e. being made up of a plurality of nozzle sectors that are disposed circumferentially end to end.

Each nozzle sector has two annular platform sectors extending one inside the other and interconnected by substantially radial vanes. The outer platform has means for fastening to an outer casing of the turbine. The nozzle sector includes an annular rail sector for supporting elements made of abradable material, the rail being situated radially inside the inner platform of the nozzle and being connected to the inside surface of said platform. The abradable material elements co-operate with annular wipers carried by the rotor of the turbine so as to form labyrinth type seals.

The nozzle sectors are separated from one another by small clearances in the circumferential direction so as to accommodate thermal expansions of their platforms when the turbine is in operation.

In operation they are subjected to vibration and to dynamic stresses that are relatively large and that can lead to small parasitic movements of the nozzle sectors and to deformations of these sectors, in particular in twisting.

Proposals have already been made to stiffen the nozzle with the help of axial bearing means formed on the sectors of the inner platform of the nozzle, the bearing means of one platform sector being designed to co-operate with corresponding means formed on the adjacent inner platform sectors in order to limit deformation of the nozzle in operation.

In the prior art, each inner platform sector has longitudinally-extending edges that are cut to be substantially Z-shaped and that are complementary to the corresponding longitudinally-extending edges of adjacent inner platform sectors. Each Z-shaped longitudinally-extending edge of a platform sector comprises two end portions parallel to the longitudinal direction that are offset in the circumferential direction and that are connected to each other by a perpendicular margin for coming to bear axially against the corresponding margin of an adjacent platform sector while the turbine is in operation so as to limit the above-mentioned parasitic movements and deformations of the nozzle.

However, that technology presents drawbacks. The longitudinally-extending edges of each platform sector need to be machined so as to from the Z-shaped cutouts. This machining is a difficult operation that runs the risk of damaging the nozzle. The machining of these longitudinally-extending edges consists in particular in making a first cut to form a bearing margin and a second cut to connect said bearing margin to an upstream or downstream circumferential edge of the inner platform. These cuts are made close to the vanes of the nozzle, and the curved shape of the vanes can interfere to a greater or lesser extent with the machining operation. Finally, that technology is applicable only to nozzle inner platforms that are relatively plane and cannot be generalized to all types of nozzle or of nozzle sector.

OBJECT AND SUMMARY OF THE INVENTION

A particular object of the present invention is to provide a solution to the problems of the prior art that is simple, effective, and inexpensive.

To this end, the invention provides a sectorized nozzle for a turbomachine, the nozzle being made up of cylindrical sectors placed end to end and each having two coaxial annular platform sectors interconnected by substantially radial vanes, and an annular rail sector for supporting elements of abradable material, the rail sector being radially inside the sector of the inner platform and being connected to said inner surface of the platform sector, each nozzle sector including, on the longitudinally-extending edges of the sector of the inner platform, means for mutual circumferential engagement that co-operate with corresponding means provided on an adjacent nozzle sector, wherein the longitudinally-extending edges of the inner platform sectors form V-shapes.

According to the invention, the longitudinally-extending edges of the inner platform sectors are V-shaped instead of being Z-shaped. These longitudinally-extending edges are thus defined by two margins, compared with three in the prior art. The longitudinally-extending edges are thus simpler in shape, so machining them is simple and faster since it consists in making a single oblique cut in each longitudinally-extending edge of the platform sectors, as compared with two cuts in the prior art (a cut in the circumferential direction and a longitudinal cut).

Preferably, the inner platform sector of each nozzle sector has one longitudinally-extending V-shaped edge with an angle at the apex that is greater than 180° and an opposite longitudinally-extending edge with an angle at the apex that is less than 180°. The first longitudinally-extending edge of each platform sector may be of a shape that is complementary to the second longitudinally-extending edge thereof, and all of the inner platform sectors may be identical so as to simplify fabrication of the nozzle sectors and so as to be suitable for mutually engaging the longitudinally-extending edges of the inner platform sectors one in another when fastening the nozzle sectors to the turbine casing.

By way of example, each longitudinally-extending edge of each sector of the inner platform has an upstream portion that is substantially parallel to the axis of revolution of the nozzle and a downstream portion that is oblique relative to said axis. The oblique downstream portion of one of the longitudinally-extending edges of the inner platform sector may be substantially parallel to the downstream portion of the suction side of the vane adjacent to said longitudinal edge. The downstream portion of this longitudinally-extending edge thus follows in part the curvature of the vane situated close to said longitudinally-extending edge. There is no risk of the machining performed to make this downstream portion doing damage to the vane, since the cutter tool is further away from the vane and is moved in a direction that is parallel to the curvature thereof, so there is no risk of it coming into contact with the vane.

The oblique downstream portion of one longitudinally-extending edge of the inner platform sector is substantially parallel to the oblique downstream portion of the other longitudinally-extending edge of said platform sector, such that the longitudinally-extending edges of the platform sectors are mutually complementary.

According to another characteristic of the invention, the rail sector of each nozzle sector comprises, at one of its circumferential ends, means for bearing axially on the rail sector of an adjacent nozzle sector. The means bearing axially between the nozzle sectors are thus no longer formed on the inner platform sectors but are offset to the sectors of the rail for supporting the abradable elements, and this is most advantageous for the following reasons.

The axial bearing means are situated radially inside the inner platform of the nozzle and their shapes and dimensions are not limited relative to those of the inner platform. These bearing means are carried by or are formed on the nozzle rail sectors, and they can be made integrally with said rail sectors by machining or casting, or they can be fittings that are fastened thereto.

Furthermore, the present invention is not limited to one particular type of nozzle or nozzle sector.

The rail sector has a section that is substantially L-shaped and comprises a substantially radial wall connected at its outer periphery to the inside surface of an inner platform sector and at its inner periphery to one end of a sector of a substantially cylindrical wall carrying elements of abradable material, the axial bearing means of said rail sector being carried by its radial wall.

The bearing means may be formed on the upstream face of the radial wall of the rail sector. Under such circumstances, the axial bearing means oppose twisting deformation of the nozzle sectors due in particular to the aerodynamic forces applied to the vanes of said sectors in operation. In a variant, the bearing means are formed on the downstream face of the radial wall of the sector of the rail.

According to another characteristic of the invention, each rail sector includes at least one lateral tab extending circumferentially towards an adjacent rail sector and including a face for bearing axially against said adjacent rail sector. This axial bearing face is substantially perpendicular to the axis of revolution of the nozzle, and it faces upstream or downstream.

The invention also provides a low-pressure turbine for a turbomachine that includes at least one sectorized nozzle of the above-specified type, and it also provides a turbomachine, such as an airplane turboprop or turbojet, that includes at least one nozzle as described above.

BRIEF DESCRIPTION OF THE DRAWINGS

The invention can be better understood and other details, characteristics and advantages of the present invention appear more clearly on reading the following description made by way of non-limiting example and with reference to the accompanying drawings, in which.

MORE DETAILED DESCRIPTION

Figure 1:
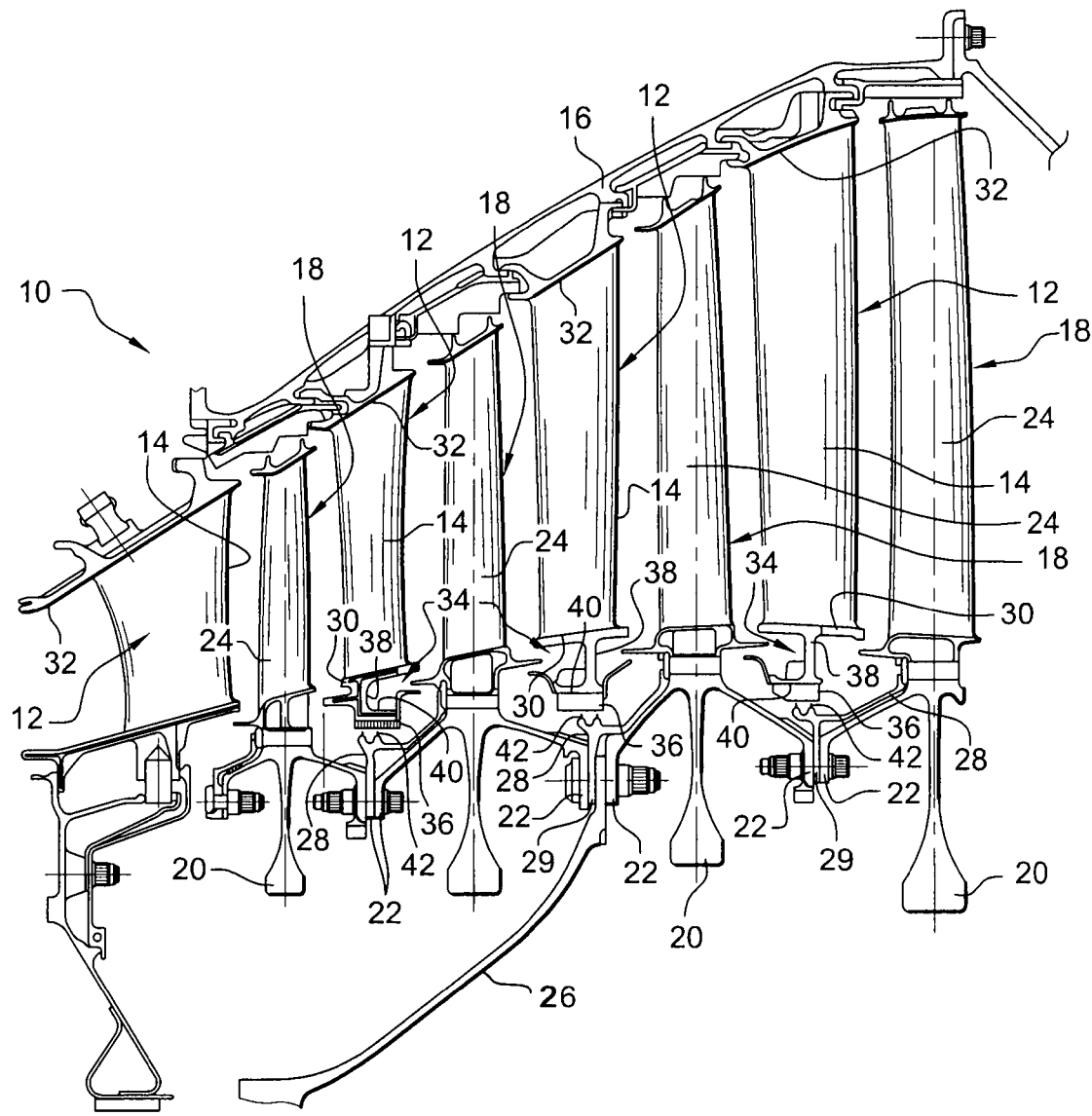
FIG. 1 is a diagrammatic half-view in axial section of a low pressure turbine of a turbomachine.

Reference is made initially to FIG. 1 which shows a low pressure turbine 10 for a turbomachine, the turbine comprising four stages each having a nozzle 12 carried by an outer casing 16 of the turbine and a turbine wheel 18 situated downstream from the nozzle 12.

The wheels 18 comprise disks 20 assembled together in axial alignment by annular flanges 22 and carrying blades 24 that are substantially radial. These wheels 18 are connected to a turbine shaft (not shown) via a drive cone 26 that is fastened to the annular flanges 22 of the disks.

Annular retaining plates 28 for axially retaining the blades 24 on the disks 20 and are mounted between the disks, with each having an inner radial wall 29 that is clamped axially between the annular flanges 22 of two adjacent disks.

Each nozzle 12 comprises two annular platforms 30 and 32 that are coaxial, constituting respectively an inner platform and an outer platform, and defining between them an annular gas flow passage through the turbine, and between which there extend stationary vanes 14 that are substantially radial. The outer platforms 32 of the nozzles are secured by suitable means to the outer casing 16 of the turbine.

Each of the inner platforms 30 of the nozzles is connected to an annular rail 34 that supports annular elements 36 of abradable material. Each annular rail 34 is arranged radially inside the inner platform 30 of a nozzle and presents a section that is generally L-shaped. The rail 34 has a substantially radial annular wall 38 that is connected at its outer periphery to the inside surface of the inner platform 30 of the nozzle and at its inner periphery to an axial end of a cylindrical wall 40 that supports the abradable elements 36.

These abradable elements 36 are arranged radially outside and facing outer annular wipers 42 carried by the retaining plates 28. The wipers 42 are for rubbing against the elements 36 so as to form labyrinth seals, thereby limiting the passage of air in the axial direction through these seals.

The nozzles 12 of the turbine are sectorized, each being made up of a plurality of sectors disposed circumferentially end to end along the longitudinal axis of the turbine.

Figure 2:
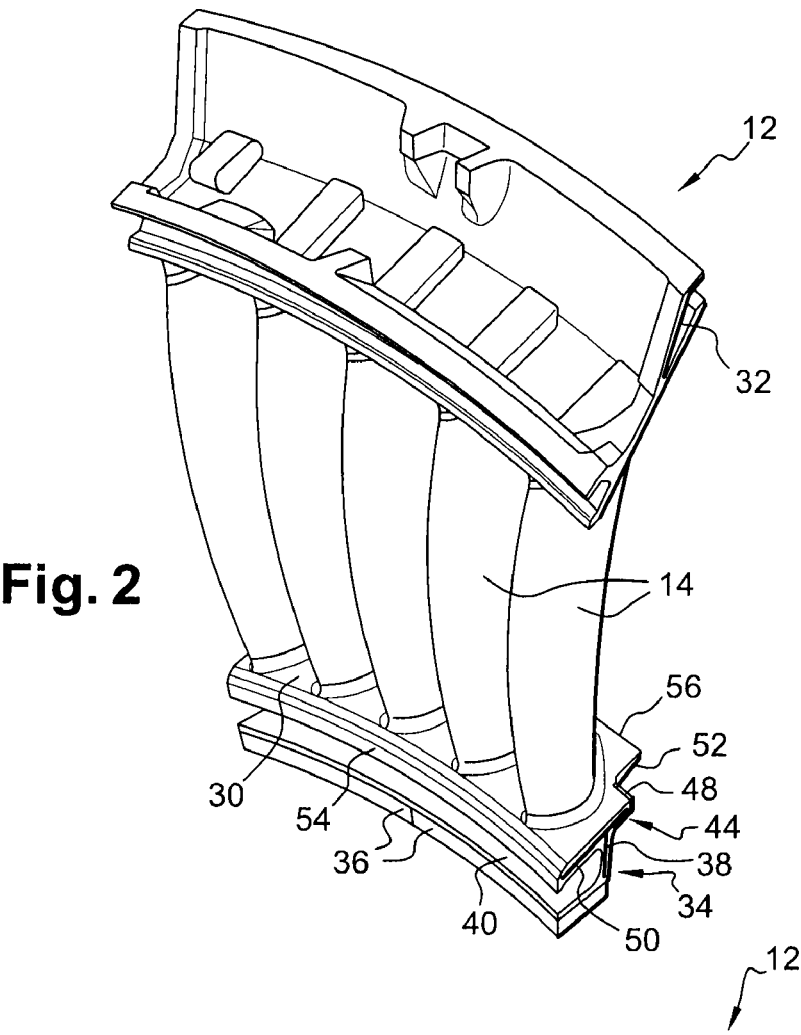
FIGS. 2 and 3 are diagrammatic perspective views of a nozzle sector of a turbine, in accordance with the art prior to the invention.
Figure 3:
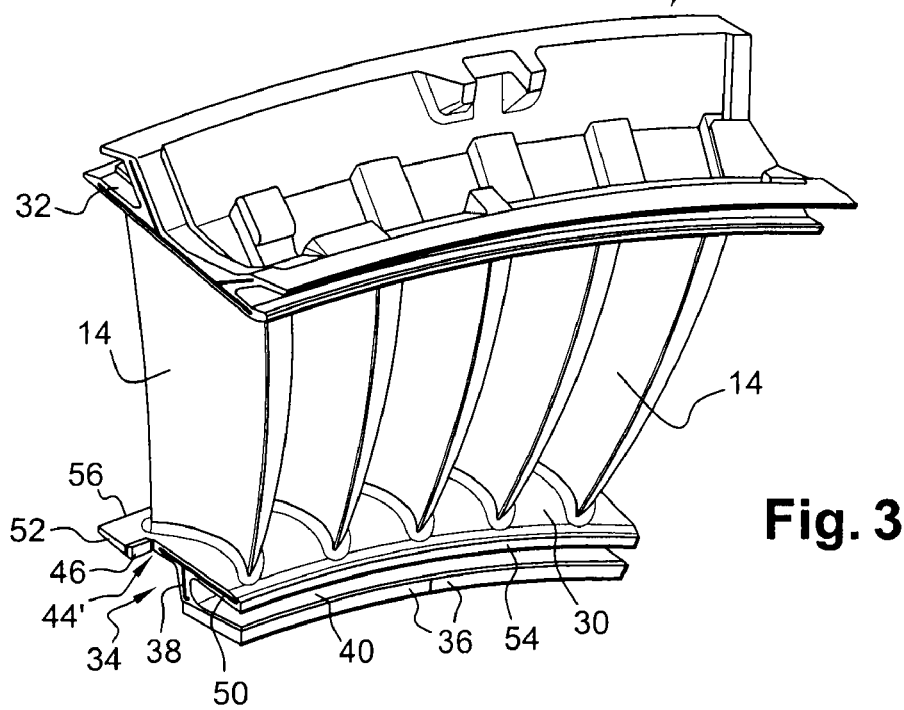

FIGS. 2 and 3 show a sector of a nozzle 12 made in accordance with the art prior to the present invention. This sector of a nozzle 12 comprises a sector of the inner platform 30 and a sector of the outer platform 32, which sectors are interconnected by five vanes 14.

The longitudinally-extending edges of the sectors of the inner and outer platforms 30 and 32 present shapes that are complementary to the longitudinally-extending edges corresponding thereto of the adjacent platform sectors of the nozzle sectors so that the longitudinal edges engage circumferentially one in another when the nozzle is assembled.

In the prior art, the longitudinally-extending edges 44 and 44' of the inner platform 30 are machined to have a Z-shape so as to define axial bearing means between the sectors of the nozzle 12.

Each of the longitudinally-extending edges 44, 44' of the sectors of the inner platform 30 includes an axial bearing margin 46 (or 48) that extends substantially perpendicularly to the longitudinal axis of the turbine and that faces upstream (margin 46)—or downstream (margin 48)—and is designed to bear axially against a corresponding bearing margin facing downstream (margin 48)—or upstream (margin 46)—of an adjacent sector of the inner platform 30. Each sector of the inner platform 30 includes at one of its lateral ends a bearing margin 46 facing upstream and at its other lateral end a bearing margin 48 facing downstream. The axial thrust of a sector of the inner platform 30 on an adjacent sector of the inner platform enables parasitic movements and vibration of the sectors of the nozzle 12 to be limited while the turbine is in operation.

Each bearing margin 46, 48 is connected at a first circumferential end to the downstream end of a longitudinally-extending margin 50 that extends to the upstream circumferential edge 54 of the sector of the platform 30, substantially parallel to the longitudinal axis of the turbine. The second circumferential end of the bearing face 46, 48 is connected to the upstream end of a second longitudinal margin 52 that is connected at its other end to the downstream circumferential edge 56 of the sector of the platform 30. The margins 50, 52 are parallel to each other and they are offset from each other in the circumferential direction by a distance equal to the circumferential size of the bearing margins 46, 48.

Machining the longitudinally-extending edges of the sectors of the inner platform 30 presents numerous drawbacks as described above. The invention enables these problems to be remedied at least in part by simplifying the longitudinally-extending edges of the sectors of the inner platform 30 by making them V-shape.

Figure 4:
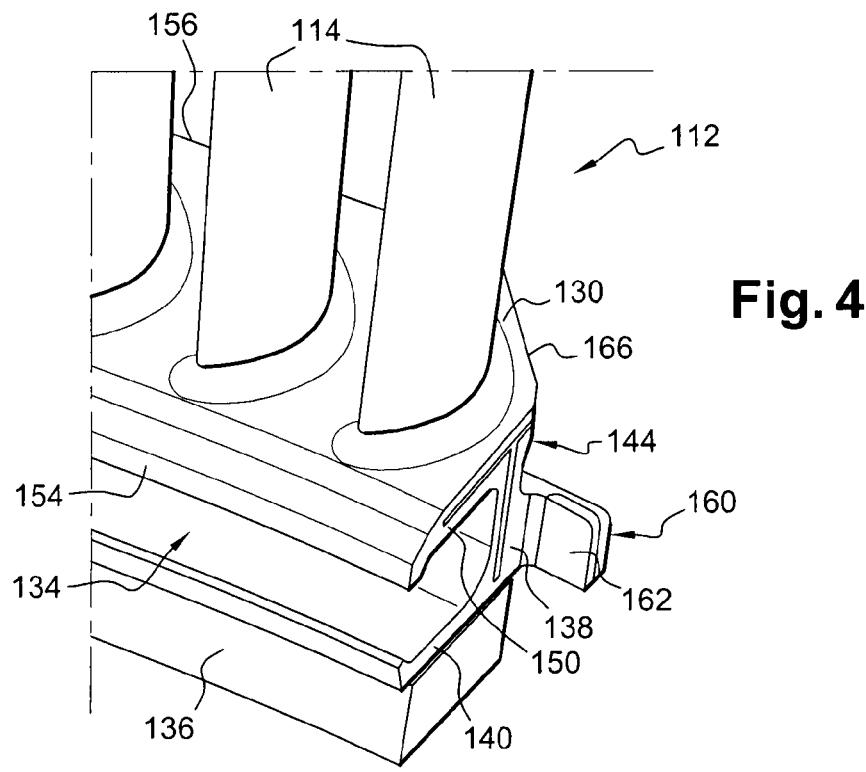
FIGS. 4 and 5 are fragmentary diagrammatic views in perspective of a turbine nozzle sector of the invention.
Figure 5:
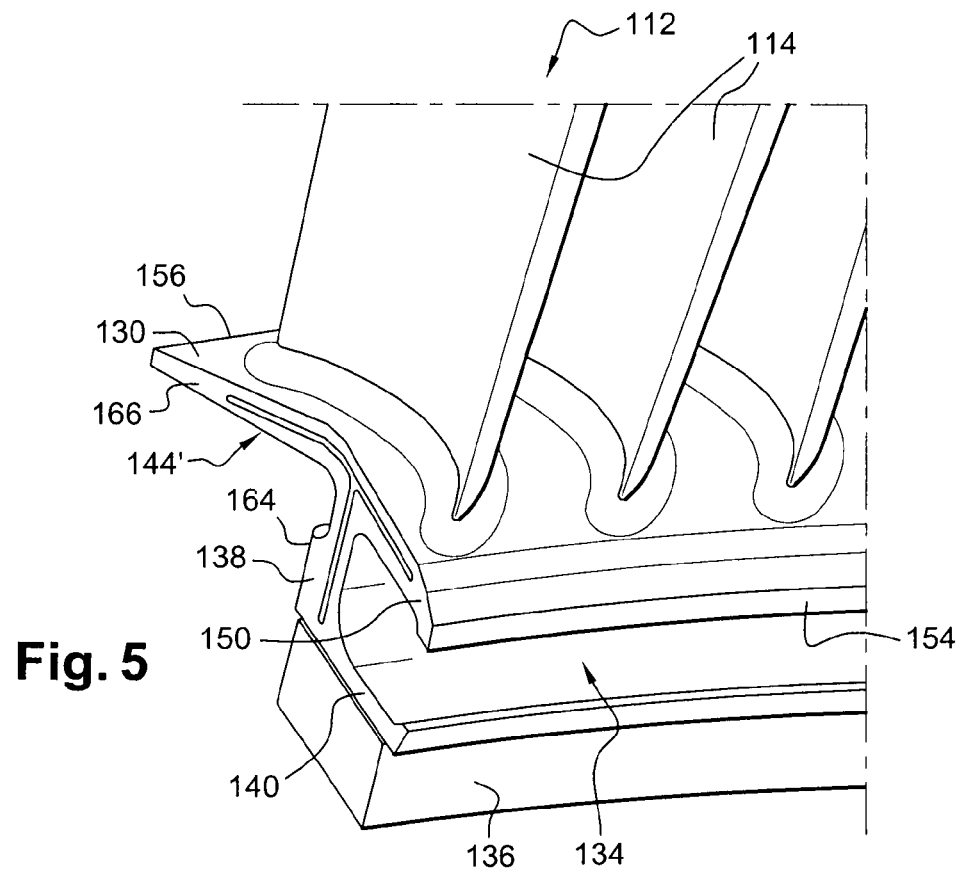

In the embodiment of the invention shown in FIGS. 4 and 5, the inner platform sector 130 of each nozzle sector has a first longitudinally-extending edge 144 that is V-shaped with an angle at the apex that is greater than 180° (FIG. 4), for example lying in the range 210° to 240°, and a second longitudinal edge 144' that is V-shaped with its angle at the apex being less than 180° (FIG. 5), for example lying in the range 120° to 150°.

The first longitudinally-extending edge 144 of each inner platform sector 130 is complementary to its second longitudinally-extending edge 144', and the sectors of the inner platform in all of the nozzle sectors are identical so that the longitudinally-extending edges 144, 144' of each platform sector 130 can engage in the corresponding longitudinally-extending edges of the adjacent platform sectors 130.

Each of the longitudinally-extending edges 144, 144' of each inner platform sector 130 has a first margin 150 or upstream end portion that extends in a longitudinal direction from the upstream circumferential edge 154 of the platform sector 130 to the connection between the radially extending wall 138 of the rail sector 134 and the platform sector 130. Each longitudinally-extending edge 144, 144' has a second margin 166 or downstream end portion that extends obliquely relative to the longitudinal axis of the turbine, this second margin 166 directly connecting the downstream end of the first margin 150 to the downstream circumferentially-extending edge 156 of the inner platform sector 130. The second margins 166 of the longitudinally-extending edges 144, 144' of the inner platform sector 130 are mutually parallel. The margin 166 of the longitudinally-extending edge 144 extends substantially parallel to and at a short distance from an end portion of the suction side of the vane 114 situated in the vicinity of said edge 144 (FIG. 4), and the margin 166 of the other longitudinally-extending edge 144' extends substantially parallel to and at a short distance from an end portion of the pressure side of the opposite vane 114 situated in the vicinity of said edge 144' (FIG. 4).

The oblique margins 166 of the inner platform sectors 130 can bear against one another so as to limit the parasitic deformation and movements of the nozzle sectors in operation.

In order to increase the stiffness of the nozzle of the invention, the rail sector 134 of each nozzle sector 112 has at one of its circumferential ends a lateral tab 160 bearing axially against the rail sector of an adjacent nozzle sector. The tab 160 has an orientation that is substantially circumferential and includes a first circumferential end connected to the rail sector 134, via its outer radial wall 138. The second circumferential end of the tab 160 includes an axial bearing face 162 for co-operating with a corresponding face 164 of the outer radial wall 138 of the adjacent rail sector 134, the faces 162 and 164 being substantially perpendicular to the longitudinal axis of the turbine.

In the example shown, the tab 160 is situated downstream from the radial wall 138 of the rail sector 134 and is connected via its first end to a downstream face of said wall.

The bearing face 162 of this tab faces upstream and is designed to bear against a downstream-facing face 164 of the radial wall 138 of the adjacent rail sector 134.

In a variant, the tab 160 is situated upstream from the radial wall 138 of the rail sector and is connected via one end to an upstream face of said wall, the bearing face 162 of said tab facing downstream and co-operating with an upstream-facing face 164 of the radial wall of the adjacent rail sector 134.

The rail sector 134 in each nozzle sector 112 may be made as a single casting or by machining with at least one lateral bearing tab 160 of the above-described type. In a variant, the lateral tab 160 is a fitting and is fastened to one circumferential ends of each rail sector. Any type of nozzle sector may be fitted with this type of bearing tab.

What is claimed is:

1. A sectorized nozzle for a turbomachine comprising:
cylindrical nozzle sectors placed end to end and each having two coaxial annular platform sectors interconnected by substantially radial vanes; and
a sector of an annular rail for supporting elements of abradable material, the rail sector located radially inside the inner coaxial annular platform sector and connected to an inner surface of the coaxial annular platform sector, each nozzle sector including on longitudinally-extending edges of the inner coaxial annular platform sector, means for mutual circumferential engagement that co-operates with corresponding means provided on an adjacent sector of the sectorized nozzle,
wherein the longitudinally-extending edges of the inner coaxial annular platform sectors form V-shapes.

2. The sectorized nozzle according to claim 1, wherein the inner coaxial annular platform sector of each nozzle sector has one longitudinally-extending V-shaped edge with an angle at the apex that is greater than 180° and an opposite longitudinally-extending edge with an angle at the apex that is less than 180°.

3. The sectorized nozzle according to claim 1, wherein each longitudinally-extending edge of each inner coaxial annular platform sector has an upstream portion that is substantially parallel to the axis of revolution of the sectorized nozzle and a downstream portion that is oblique relative to said axis.

4. The sectorized nozzle according to claim 3, wherein the oblique downstream portion of one of the longitudinally-extending edges of the inner coaxial annular platform sector is substantially parallel to the downstream portion of the suction side of the vane adjacent to said longitudinally-extending edge.

5. The sectorized nozzle according to claim 3, wherein the oblique downstream portion of a longitudinally-extending edge of the inner coaxial annular platform sector is substantially parallel to the oblique downstream portion of the other longitudinally-extending edge of said coaxial annular platform sector.

6. The sectorized nozzle according to claim 1, wherein the rail sector of each nozzle sector comprises, at one of its circumferential ends, means for bearing axially on the sector of the rail of an adjacent sector of the sectorized nozzle.

7. The sectorized nozzle according to claim 6, wherein the rail sector has a section that is substantially L-shaped and comprises a substantially radial wall connected at its outer periphery to the inside surface of an inner coaxial annular platform sector and at its inner periphery to one end of a sector of a substantially cylindrical wall carrying elements of abradable material, the axial bearing means of said rail sector being carried by its radial wall.

8. The sectorized nozzle according to claim 7, wherein the bearing means are disposed on an upstream face of the radial wall of the rail sector.

9. The sectorized nozzle according to claim 7, wherein the bearing means are disposed on a downstream face of the radial wall of the rail sector.

10. The sectorized nozzle according to claim 1, wherein each rail sector includes at least one lateral tab extending circumferentially towards an adjacent rail sector and including a face for bearing axially against said adjacent rail sector.

11. The sectorized nozzle according to claim 10, wherein the axial bearing face is substantially perpendicular to the axis of revolution of the sectorized nozzle, and faces upstream or downstream.

12. A low pressure turbine for a turbomachine comprising a sectorized nozzle, the sectorized nozzle comprising:
    cylindrical sectors placed end to end and each having two coaxial annular platform sectors interconnected by substantially radial vanes; and
    a sector of an annular rail for supporting elements of abradable material, the rail sector located radially inside the inner coaxial annular platform sector and connected to an inner surface of the coaxial annular platform sector, each nozzle sector including on longitudinally-extending edges of the inner coaxial annular platform sector, means for mutual circumferential engagement that co-operates with corresponding means provided on an adjacent sector of the sectorized nozzle,
    wherein the longitudinally-extending edges of the inner coaxial annular platform sectors form V-shapes.

13. A turbomachine comprising a sectorized nozzle, the sectorized nozzle comprising:
    cylindrical sectors placed end to end and each having two coaxial annular platform sectors interconnected by substantially radial vanes; and
    a sector of an annular rail for supporting elements of abradable material, the rail sector located radially inside the inner coaxial annular platform sector and connected to an inner surface of the coaxial annular platform sector, each nozzle sector including on longitudinally-extending edges of the inner coaxial annular platform sector, means for mutual circumferential engagement that co-operates with corresponding means provided on an adjacent sector of the sectorized nozzle,
    wherein the longitudinally-extending edges of the inner coaxial annular platform sectors form V-shapes.

* * * * *